Dec. 18, 1923.

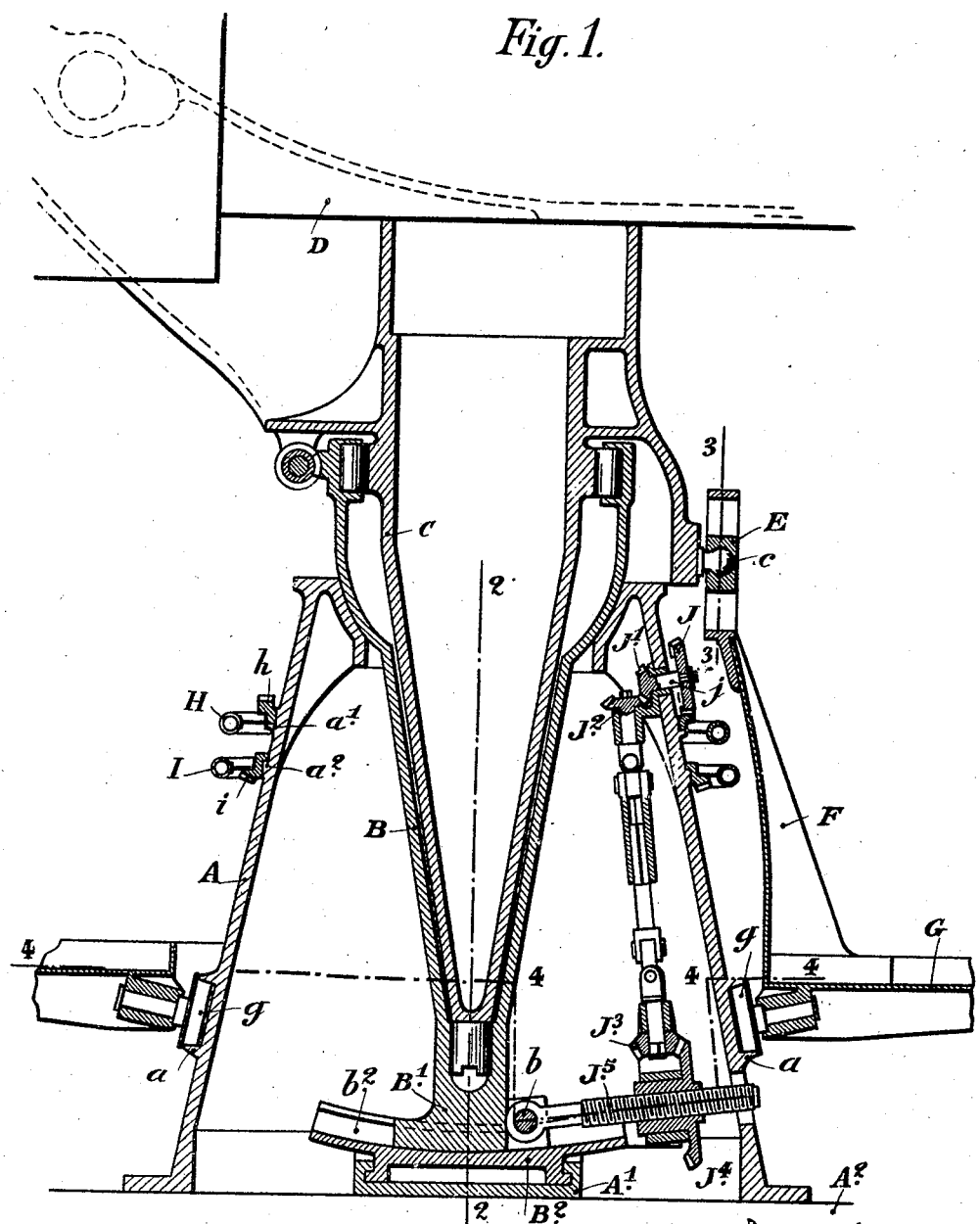

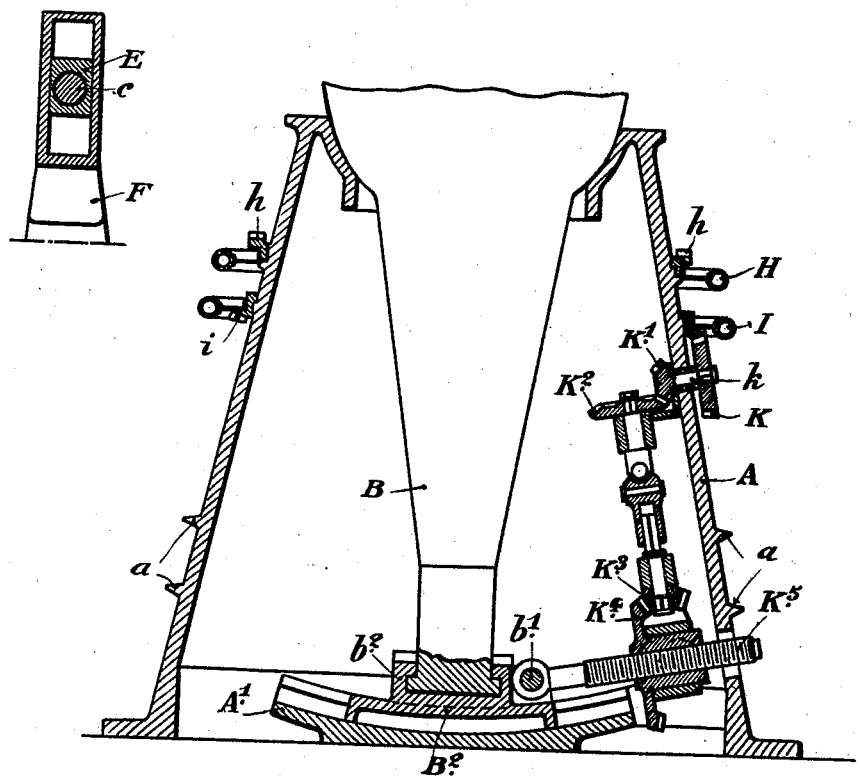

E. SCHNEIDER 1,477,980

CENTRAL PIVOT GUN CARRIAGE

Filed July 3, 1923

Inventor
Eugène Schneider
By
Maury, Cameron, Lewis & Kerkam
Attorneys

Patented Dec. 18, 1923.

1,477,980

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT STOCK COMPANY OF FRANCE.

CENTRAL-PIVOT GUN CARRIAGE.

Application filed July 3, 1923. Serial No. 649,306.

*To all whom it may concern:*

Be it known that I, EUGÈNE SCHNEIDER, a citizen of the Republic of France, resident of Paris, France, have invented new and useful Improvements in and Relating to Central-Pivot Gun Carriages, which is fully set forth in the following specification.

This invention has for its object to provide an improved central pivot gun carriage with mechanisms for effecting transverse and longitudinal adjustments of the foot-step bearing.

An embodiment of this invention is illustrated by way of example in the accompanying drawings in which:

Figure 1 is a longitudinal sectional elevation of the improved gun carriage taken along the axial plane of the mechanism for effecting the longitudinal adjustment of the foot-step bearing.

Figure 2 is a partial cross section taken along the line 2—2 of Figure 1.

Figure 3 is a partial elevation in section taken along the line 3—3 of Figure 1 of a detail.

Figure 4:
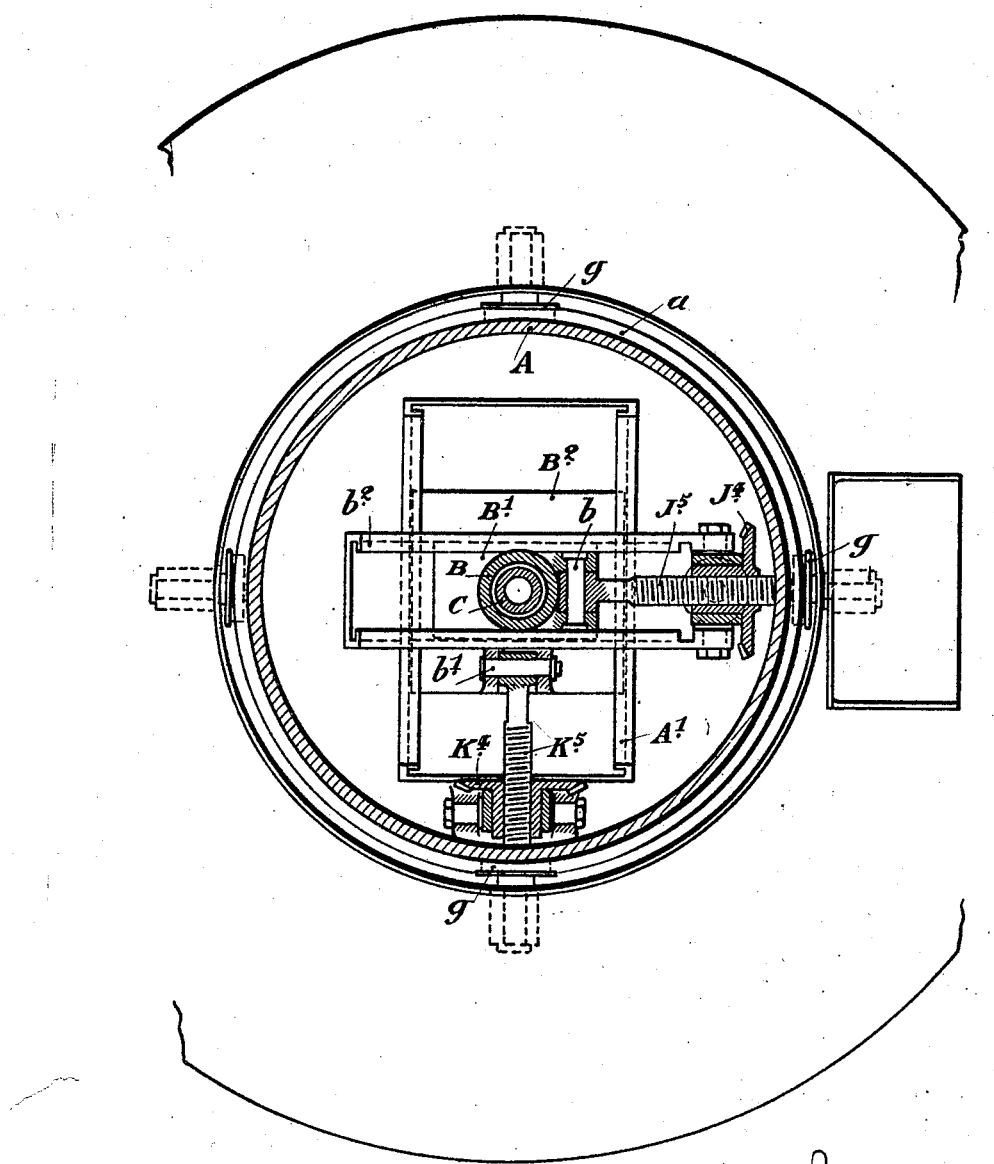
Figure 4 is a horizontal section taken along the line 4—4 of Figure 1.

The improved gun carriage comprises in the known manner a hollow pedestal A in which the foot-step bearing B, wherein turns the pivot pin C supporting the gun cradle D, is capable of being adjusted in two directions at right angles to each other.

According to this invention the central pivot C is connected by means of a ball and socket joint $c$ to a slide-block E guided in an arm F fixed to a platform G which is movable around the pedestal A and on which the gun servers take their places. Easy running of the platform may be assured by means of rollers $g$ working in a rolling track $a$ formed on the pedestal.

The main characteristic feature of this invention is the mounting, upon the pedestal A, of two hand-wheels H and I that are capable of rotating freely around the said pedestal, and serve for operating respectively the two mechanisms for adjusting the foot-step bearing B of the central pivot C.

In the illustrated example, each of these hand-wheels is fixed to a ring of teeth ($h$ and $i$ respectively) resting on a supporting ledge ($a^1$ and $a^2$ respectively) formed on the pedestal A. The ring of teeth $h$ meshes with the pinion J, the axle pin $j$ of which revolves in the pedestal and is connected in a known manner by means of a transmission gearing $J^1$—$J^2$—$J^3$—$J^4$, to a screw $J^5$ pivoted to an axial pin $b$ carried by the foot $B^1$ of the foot-step bearing B. This foot is likewise in a known manner movable in a guide $b^2$ of a slide-block $B^2$ which is movable in a direction at right angles to the axial plane of the slide-way $b^2$ in a guide $A^1$ formed in a part that is fixed to a stationary part such as the bedplate $A^2$ for the pedestal.

The ring teeth $i$, fixed to the operating hand-wheel I, mesh with a pinion K (the axle pin $k$ of which is journalled in the pedestal A) connected by transmission gearing $K^1$—$K^2$—$K^3$—$K^4$ to a screw $K^5$ pivoted at $b^1$ to the slide-block $B^2$. As will be perceived, the ball and socket joint $c$ allows a permanent connection between the slide-block E (movable in the arm F) and the central pivot C, whatever may be the longitudinal and transverse inclinations of the latter, so that the platform G will always be carried round irrespectively of the training position. On the other hand, whatever may be the position he occupies relatively to the pedestal A and to the mechanisms for effecting the adjustment, the gun server charged with operating the said mechanisms, will always find within his immediate reach, one point of the control hand-wheels (H, I) for actuating the said mechanisms.

It is to be understood that the mode of mounting the control hand-wheels around the pedestal may be varied at will. For instance these hand-wheels, for the sake of greater mobility, may be formed on the outer ring or race of a ball bearing, the inner ring or race of which is carried by the pedestal.

Having now particularly described and ascertained the nature of my said invention and in what manner the same is to be performed, I declare that what I claim is:—

1. A gun carriage comprising a pedestal, a gun pivot pin having a foot-step bearing adjustable in two directions at right angles to each other, a gun server's platform movable around the pedestal and having an arm extending therefrom, a block slidably mounted on said arm, a ball and socket joint between said block and the gun pivot pin, and a pair of hand wheels movable around said pedestal and having ring gears thereon meshing with the actuating gears of the foot-step bearing adjusting mechanism, said hand-wheels providing for adjustment of the foot-step bearing by the gun server from his position on the platform regardless of the direction of gun-fire.

2. A gun carriage comprising a pedestal, a gun pivot pin having an adjustable foot-step bearing, a platform movable around said pedestal, and a universal connection between said platform and the gun pivot pin.

3. A gun carriage comprising a pedestal, a gun pivot pin having an adjustable foot-step bearing, mechanism for adjusting said foot step bearing, and a hand wheel movable around the pedestal and geared with said adjusting mechanism.

4. A gun carriage comprising a pedestal, a gun mounting pivoted on said pedestal, a platform movable around said pedestal, and means for moving said platform around the pedestal by a turning movement of the gun, said means comprising a universal connection between the gun mounting and the platform.

5. In combination, a pedestal, a gun pivotally mounted on said pedestal and having an adjustable foot-step bearing, mechanism for adjusting said bearing in different directions, and means encircling said pedestal for actuating said adjusting mechanism from different positions around the pedestal.

6. In combination, a pedestal, a gun pivoted on said pedestal and having an adjustable foot-step bearing, a gun server's platform rotatable about said pedestal, a universal connection between said platform and the gun, mechanism for adjusting said bearing in different directions, and means for actuating said adjusting mechanism, said means enabling the gun server from his position on the platform to actuate the adjusting mechanism at different positions around the pedestal.

7. In combination, a pedestal, a gun mounting universally pivoted on said pedestal and provided with an adjustable foot step bearing, mechanism for adjusting said bearing, a gun server's platform mounted on said pedestal to rotate around the same, a universal connection between said platform and the gun mounting, and a hand wheel mounted on said pedestal to rotate around the same, said hand wheel being geared with said adjusting mechanism whereby the latter may be actuated from different positions around said pedestal.

8. In combination, a pedestal, a gun mounting having an adjustable foot step bearing, a plurality of mechanisms for adjusting said bearing in different directions, and a plurality of devices rotatable around said pedestal for actuating said adjusting mechanisms from any position around the pedestal.

9. In combination, a pedestal, a gun mounting having an adjustable foot step bearing, two mechanisms for adjusting said bearing in directions at right angles to each other, and two hand wheels mounted on said pedestal to rotate around the same, said hand wheels being geared with the two adjusting mechanisms whereby the latter may be actuated from any position around said pedestal.

10. In combination, a pedestal, a gun mounting pivoted on said pedestal and having an adjustable foot step bearing, gear operated mechanism for adjusting said bearing in different directions, a gun server's platform rotatable around said pedestal by a turning movement of the gun mounting, and a pair of hand wheels rotatable around said pedestal and provided with ring gears meshing with the actuating gears of said adjusting mechanism.

In testimony whereof I have signed this specification.

EUGÈNE SCHNEIDER.

Witnesses:
ANDRÉ MOSTICKER,
LOUIS GARDET.